May 21, 1935. B. D. BROWN 2,001,766
GLASS FURNACE
Filed March 29, 1933 3 Sheets-Sheet 1

INVENTOR
Banks D. Brown
BY
Norman N. Holland
ATTORNEY

May 21, 1935. B. D. BROWN 2,001,766
GLASS FURNACE
Filed March 29, 1933 3 Sheets-Sheet 2

INVENTOR
Banks D. Brown
BY
Norman R. Holland
ATTORNEY

May 21, 1935.  B. D. BROWN  2,001,766
GLASS FURNACE
Filed March 29, 1933   3 Sheets-Sheet 3

INVENTOR
Banks D. Brown
BY
Norman N. Holland
ATTORNEY

Patented May 21, 1935

2,001,766

UNITED STATES PATENT OFFICE 2,001,766

GLASS FURNACE

Banks D. Brown, Connellsville, Pa., assignor to Capstan Glass Company, Connellsville, Pa., a corporation of Delaware Application March 29, 1933, Serial No. 663,265

16 Claims. (Cl. 122—6)

The present invention relates to glass melting furnaces and the like, and more particularly to an improved dog house construction therefor.

Glass furnaces are ordinarily lined with suitable heat insulating or refractory material, such as fire brick, whereby all the heat supplied to the furnace is retained and is utilized in melting the raw materials. Preferably, glass furnaces are operated continuously until the fire brick is worn out or becomes inefficient in retaining the heat within the furnace. In repairing the heat insulation which has been burned out, the furnace is shut down and relined. In the operation of a glass furnace, materials are constantly added to the melting end of the furnace. A box-like construction, known as a dog house, is provided with an opening so that sand and other ingredients of the glass may be poured therein and delivered to the furnace. The sides of the dog house are lined with fire brick, or other suitable material, such as is utilized for lining the furnace. Since raw materials are added continuously, an intense heat must be maintained at the dog house end of the furnace to melt the materials quickly. Another difficulty is that the corners and projection portions of the box-shaped dog houses are worn away by the abrasive action of the sand delivered to the furnace. As a result, the dog house and the portion of the furnace adjacent thereto are the first to wear out or become impaired. In some instances, repairs may be made locally but eventually the furnace has to be shut down for repairs because of the excessive wear at or near the dog house. Shutting down a glass furnace for repairs is very costly. Several weeks are required and the many tons of glass in the furnace have to be used as cullet. In addition, the labor and materials required for repairs are substantial. Attempts to repair the dog house properly while the furnace is in operation are dangerous and expensive because of the intense heat; in addition, the quality of the glass is impaired while the repairs are being made. Usually, dog houses on glass furnaces must be repaired or rebuilt two or more times during the run of the furnace and usually cause the furnace to be relined before it would otherwise be necessary.

The present invention aims to overcome the above difficulties by providing an improved dog house construction which will remain in working condition during the life of the furnace, whereby the entire furnace construction is improved, the efficiency thereof is increased, and the cost of operating is substantially reduced.

An object of the present invention is to provide an inexpensive dog house construction for glass furnaces and the like.

Another object of the invention is to provide a dog house which need not be repaired during the run of the furnace.

Another object of the invention is to eliminate the hazards of making repairs and the danger of contaminating the glass within the furnace by repairs to the dog house.

Another object of the invention is to eliminate sharp corners in the dog house construction and to provide members which are not adversely affected by the abrasive nature of the raw materials.

Another object of the invention is an improved cooling system for protecting the portions of the dog house which must resist the greatest wear.

A further object of the invention is to provide improved means for introducing raw materials to glass furnaces.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming part of the specification, wherein Fig. 1 is a perspective view, partly in section, illustrating a preferred embodiment of the present invention applied to a glass furnace, the feeding devices being omitted;

Figure 1:
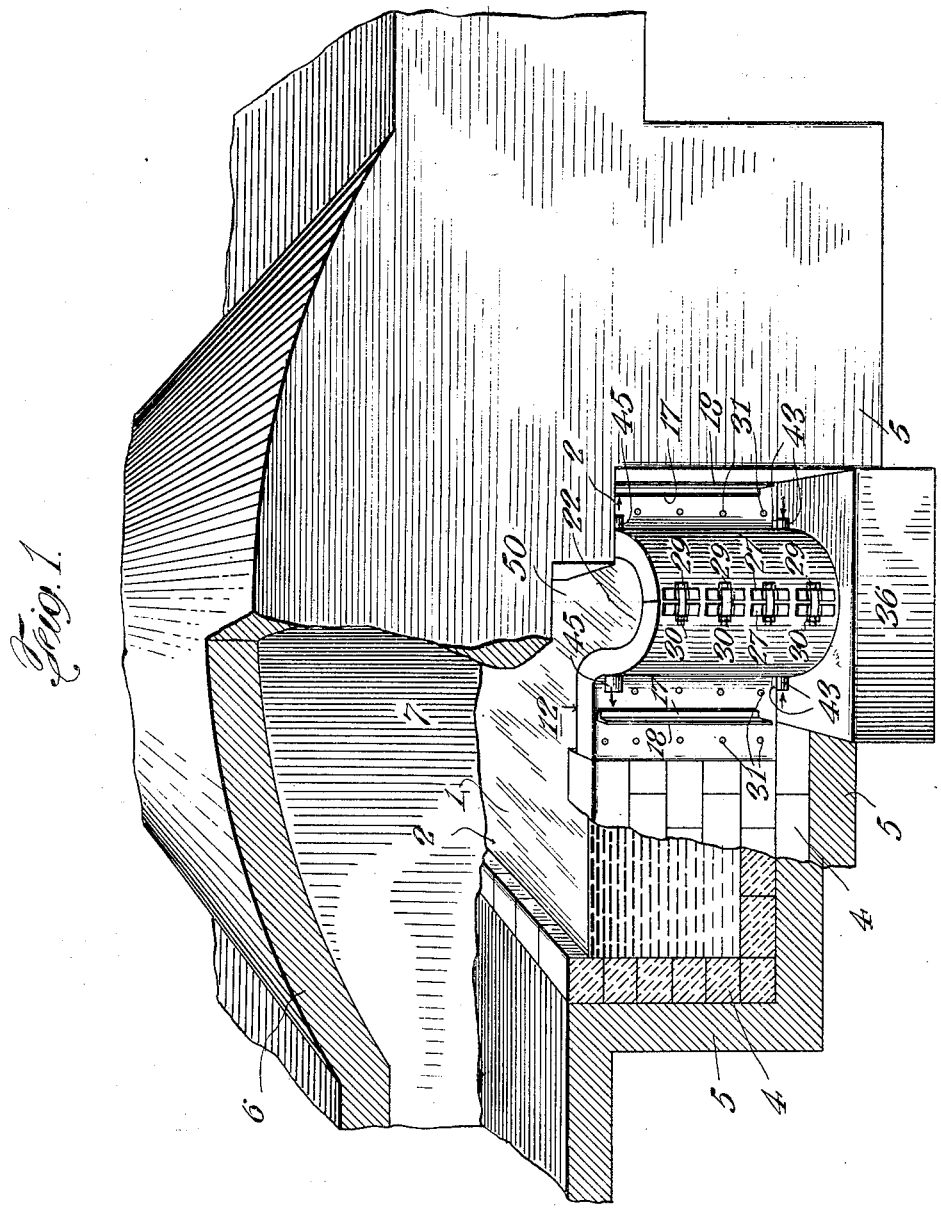

Referring again to the drawings, there is shown a glass furnace adapted to receive and melt a batch of glass 1 within a substantially shallow tank portion 2, which is lined with fire bricks 4 or with other suitable heat insulating material. An outer wall 5 is built around the tank portion 2 and a top portion or arch 6 provides a combustion chamber 7 above the tank adapted to receive combustible gases through flues or ports at one side of the tank, while flues are provided at the other side for exhausting the spent gases in accordance with the present practices.

Glass furnaces are operated continuously, the raw materials being supplied substantially continuously at one end and molten glass being delivered at the other end to fabricating machines. The present invention pertains more particularly to the dog house, where the raw materials are delivered to the furnace.

A dog house embodying the present invention may be constructed in two sections to facilitate attaching it to the melting furnace. In the preferred embodiment, two similar sections are shown, although the parts may be otherwise constructed. Since the two sections of the dog house, as shown, are substantially identical and symmetrical, it will be necessary to refer in detail to only one of them.

Figure 2:
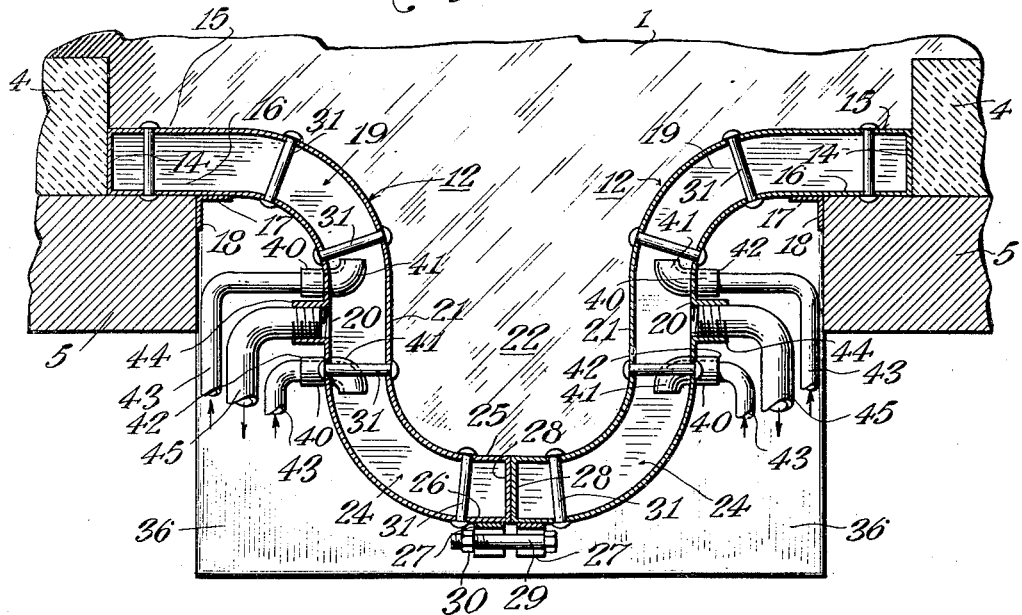
Fig. 2 is an enlarged sectional view of the dog house shown in Fig 1.
Figure 3:
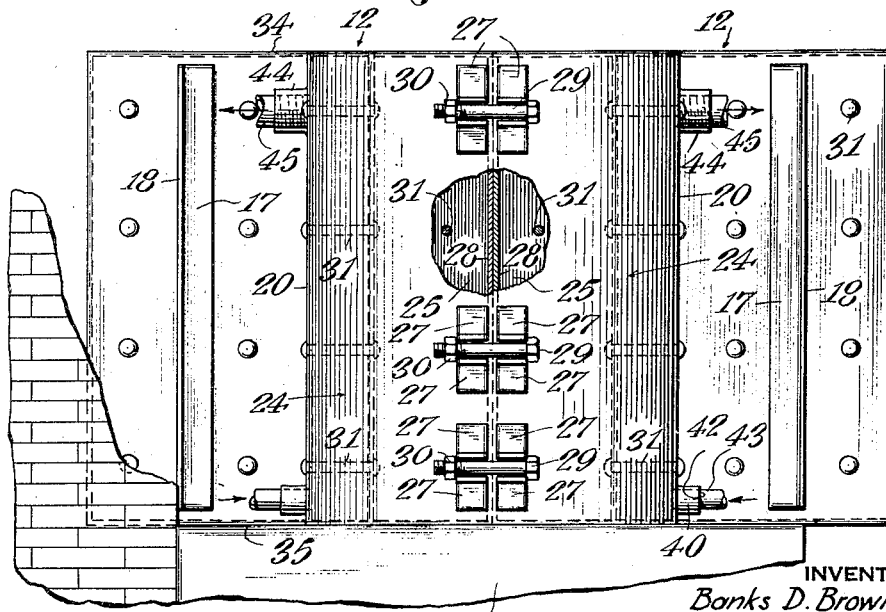
Fig. 3 is an enlarged fragmentary elevational view, partly in section, of the end of the furnace, illustrating the dog house construction.

Referring more particularly to Figs. 2 and 3 of the drawings, there is shown a jacket or plate member 12, extending from the furnace bottom to the top of the fire brick, slightly above the level of the molten glass. Preferably, the jacket is constructed of suitable metal plates welded together to form seamless joints. The jacket 12 may have a substantially straight end portion 14 which is adapted to abut against the furnace blocks 4 and is adapted to be cemented thereto. Portions 15 and 16 are provided adjacent to portion 14 and are bent at right angles thereto, whereby the inner portion 15 forms an end wall substantially in line with the furnace blocks, and the outer portion 16 is adapted to fit against the back wall of the furnace. To provide means for attaching the dog house to the furnace, an angle iron 17 may extend along the height of the portion 16 and may be welded thereto. The outwardly projecting portion 18 of the angle iron 17 abuts against the end of the back wall of the furnace and may be attached thereto by suitable stay rods or studs lodged in the back wall, having suitable nuts secured thereon (not shown in the drawings). If desired, the studs may be eliminated by cementing the portion 18 to the back wall 5.

At a convenient distance from the angle iron, or other suitable member, the jacket 12 is curved outwardly to provide a rounded or elbow portion 19. The advantage of this elbow portion is that sharp corners are eliminated, particularly at the inside of the furnace, so that the curved portion is not materially affected by the abrasive nature of the raw material. Adjacent to the elbow, straight portions 20 and 21 are provided, which extend outwardly and away from the back of the furnace, whereby a suitable chamber 22 is provided for receiving the raw materials.

In order to bring the respective sections of the dog house together, the plate members form an elbow 24 having straight portions 25 and 26 adjacent thereto, which terminate in an end wall 28, adapted to fit against the end wall of the other dog house jacket. The two elbows 19 and 24, with their adjacent parts, form substantially an S shape. In order to provide a secure connection between both sections of the dog house at their juncture, the plate members are provided with lugs 27, preferably welded thereto, which are adapted to receive bolts 29, having nuts 30 threaded thereon. In this manner, the nuts may be tightened upon the bolts to securely hold the dog house sections together, and, in effect, provide an integral unit.

In order to increase the structural strength and to prevent buckling of the jackets, stay bolts 31 are welded between the inner and outer jacket plates, at convenient intervals. To provide a liquid-tight jacket, the top and bottom portions 34 and 35 of the jacket may be formed integral with the side plates or, if desired, may be welded thereto.

The back end of the furnace is extended outwardly at 36 and suitable fire bricks 37 form the bottom of the extension. If desired, the bottom portions 35 of the dog house water jackets may be built into the fire brick 37, or may be cemented or otherwise secured thereto.

The present invention contemplates cooling the jacket with a suitable fluid, such as water, adapted to remove heat, particularly from the inner plate portions which are in contact with the molten glass. Preferably, these plates are cooled so rapidly that the glass in contact therewith is chilled sufficiently to form a glass coating thereon. This coating will not interfere with the loading or charging of the furnace but will serve as heat insulation for the plates and will prevent wearing of the plates due to the abrasive character of the raw materials. In addition, the glass coating prevents burning or corrosion of the plates caused by the hot gases of the furnace.

In order to cool the plates, a pair of inlets 40 are welded to the plate portion 20, near the bottom of the jacket. These inlets preferably comprise nipples which extend into the jacket and are provided with elbows 41 causing the ends thereof to face in substantially opposite directions, whereby the cooling liquid is directed towards both ends of each jacket section. The outwardly projecting portions 42 of the inlets are threaded or provided with suitable means for connecting liquid supply pipes 43 thereto. At the upper part of the plate portion 2, an outlet nipple 44 is welded thereto, which is threaded to receive a pipe 45 for discharging the spent cooling liquid. By injecting the cool fluid substantially at the bottom and in opposite directions to cause a swirling action, and thereafter removing it from the upper level of the jacket, an effective and efficient cooling and circulating system is provided. It will also be noted that the cooling liquid is directed against the inner curved portion 19 to insure cooling thereof so that a glass coating is formed thereon. This portion is, ordinarily, subjected to the severest strain but, by means of eliminating the sharp corners and cooling the plates sufficiently, it is substantially strengthened and provides a dog house which is adapted to outlast the furnace.

Figure 4:
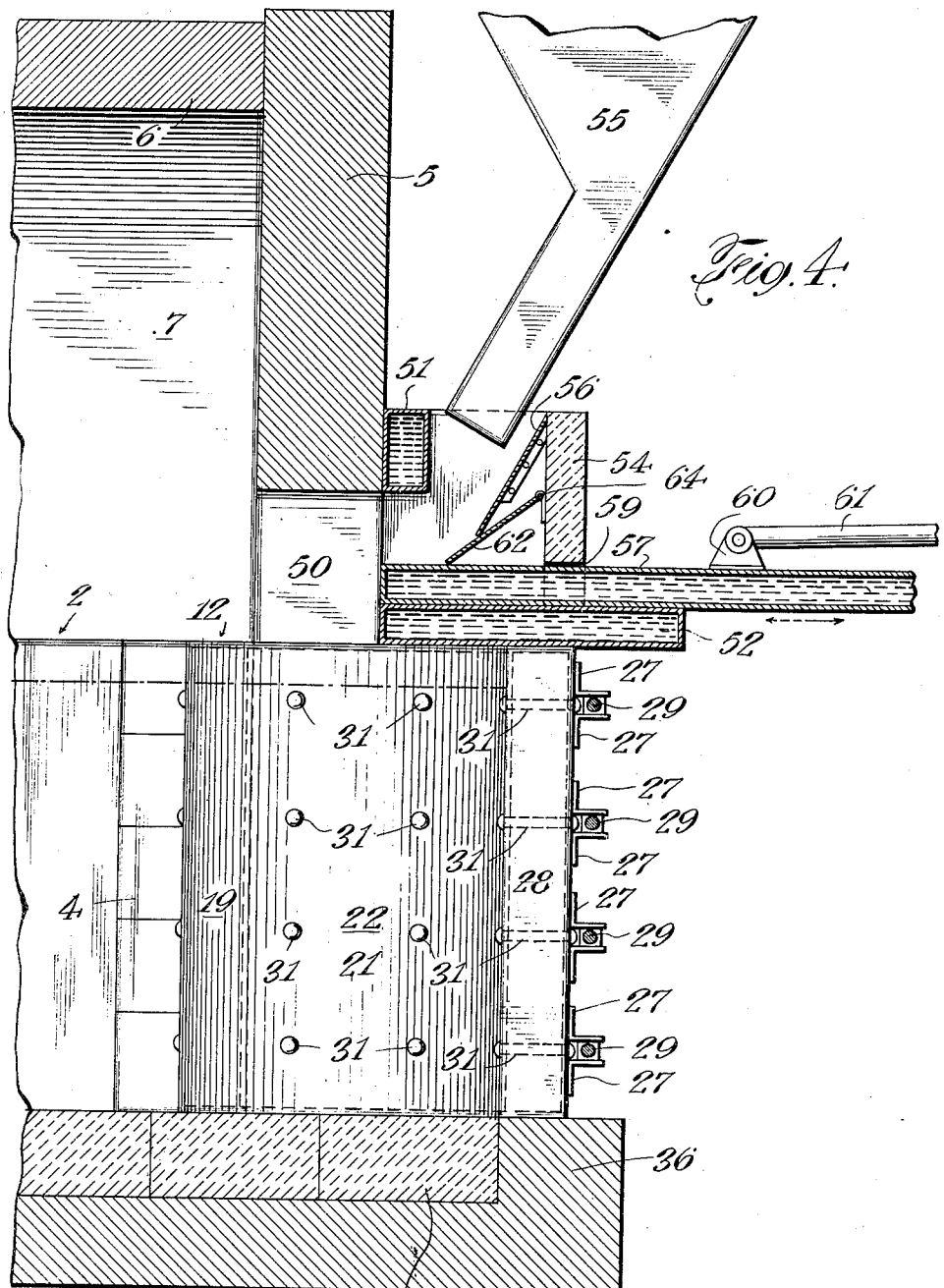
Fig. 4 is a sectional view, illustrating preferred means for feeding raw materials to the dog house.

In Fig. 4, there are shown preferred devices for delivering charges of raw materials into the dog house opening 50, formed in the back walls of the furnace. If desired, a suitable water-cooled casing 51 may be placed about the top and sides of the opening to prevent heat from radiating therefrom. Preferably, a water-cooled jacket member 52 is secured to the top of the dog house jackets 12 to provide a cover for the chamber 22, upon which is mounted a box-shaped construction 54 adapted to receive the raw materials from a hopper or chute 55. An inclined member 56 is attached to the box construction 54 for deflecting the raw materials inwardly toward the opening 50. If desired, the reception box 54 may be water-cooled or constructed of heat insulating material.

Preferably, a water-cooled jacket 57 is slidably mounted above the cover member 52 for pushing raw materials from the cover into the furnace. As shown in Fig. 4, the member 57 extends through a slot or opening 59 in the back wall of the construction 54, so that the outwardly extending end may be provided with a lug 60 for connecting an arm 61 of a suitable reciprocation mechanism (not shown) thereto. As the plate member 57 reciprocates, the cover 52 is scraped clean so that raw materials cannot adhere thereto or be melted thereon. Likewise, to prevent coating of the pusher plate 57, a member 62 is hinged to the construction 54, at 64, to scrape the plate 57 upon backward movement thereof.

The dog house shown may be applied to both new and old furnaces. The sections of the dog house are set in so that portions 14 and 16 fit against the furnace blocks and the back wall, respectively, and the angle iron 17 fits against the back wall. The bottom, if desired, may be cemented to the floor portion 37 of the tank, while the angle iron and portions adjacent thereto may be cemented, or otherwise secured, to the back wall and the fire brick of the furnace. The abutting portions 27 of the water jacket sections may then be connected by applying the bolts 29 and securing nuts 30 thereon. The inlet pipes 43 and outlet pipes 45 for cooling fluid may thereafter be connected to the respective inlets and outlets provided on the jackets. The cover and feeding devices may then be mounted above the dog house.

It will be seen that the present invention provides an improved dog house construction which is inexpensively constructed from suitable plate members, water-cooled to form a coating thereon, and adapted to resist the abrasive action of the raw materials. In fact, the cooled metal surface causes a coating of rigid glass to adhere thereto and to protect it from the abrasive action of the sand. An efficient and effective cooling system is provided for the water jackets, whereby a coating of sufficient thickness is provided to protect the plates, thus preventing them from being impaired by the hot gases of the furnace. The feeding devices feed the charges of raw material into the furnace at a uniform rate and also prevent excessive heat from radiating from the dog house opening. The sections of the dog house are inexpensively constructed from readily obtainable parts. The parts of the present invention are rugged in construction and fully capable of withstanding the rough usage and the high temperatures to which they may be subjected. As a result, the dog house and the parts adjacent thereto are the last parts of the furnace to be impaired by the furnace operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a device of the class described, the combination in a furnace having an opening at one end of a plurality of cooling jackets in vertical alignment with the back wall of the furnace, said jackets fitting into the opening and having a curved part extending outwardly therefrom to provide a chamber for feeding raw materials to the furnace.

2. In a device of the class described, the combination in a glass furnace having an opening at one end of a pair of cooling jackets, a portion of each of said jackets fitting into an opening in the back wall of the furnace and having a portion extending outwardly therefrom to provide a chamber for feeding raw materials to said furnace, and means for connecting the outwardly extending portion of said jackets to each other.

3. In a device of the class described, the combination in a furnace having an opening at one end for the reception of raw materials, of a cooling jacket having a portion extending into said opening and a portion extending outwardly from said opening and from the back wall of the furnace, said jacket being substantially U-shaped to eliminate sharp corners and minimize the wear of said jacket by the abrasive nature of the raw materials fed to said furnace.

4. In a device of the class described, a glass furnace having an opening at one end, a pair of S-shaped jackets fitting into said opening at one end thereof and extending outwardly from said furnace, and means for connecting the outwardly extending ends of said jackets to provide a dog house for feeding raw materials to said furnace.

5. A dog house for glass furnaces and the like comprising in combination a pair of jackets constructed of metal plates, said jackets being curved outwardly from said furnace to form a chamber, a member extending into each of said jackets for introducing a cooling fluid against the curved portions of said jackets, said member having means at the outer end thereof for connecting a pipe thereto, a member connected to each of said jackets for discharging the cooling fluid from said jackets, and means for connecting said jackets together.

6. A dog house for glass furnaces and the like comprising in combination a pair of S-shaped jackets, a member at the lower side of each jacket having a portion extending inwardly into said jacket for introducing a cooling fluid, said portion being substantially curved to introduce a fluid in a single direction, each of said jackets having an outlet at the upper side of said jacket for discharging the cooling fluid.

7. A dog house for glass furnaces and the like comprising in combination a jacket having arcuate portions curved in opposite directions, a pair of members extending inwardly into said jacket for introducing a cooling fluid, each of said members being bent in different directions to direct the cooling fluid against said arcuate portions and to cause a swirling action of the cooling fluid within said jacket, said jacket having an outlet for discharging the fluid.

8. A dog house for furnaces and the like comprising in combination a pair of jackets secured together at adjacent ends thereof, said jackets being substantially curved to provide a chamber for introducing raw materials to the furnace and to eliminate corners on the interior thereof, and members extending into said jackets for injecting a cooling fluid, said members being arranged to direct a cooling fluid against the curved side portions of the interior of said jackets.

9. A dog house for glass furnaces and the like comprising in combination a pair of substantially S-shaped jackets constructed of metal plates secured together to form a substantially U-shaped box-like construction, said jackets having smooth arcuate portions between the ends thereof, and means for directing a cooling fluid against said arcuate portions to minimize the wear thereof.

10. A dog house for glass furnaces and the like comprising in combination a pair of jackets constructed of metal plates arranged to provide a U-shaped outwardly extending portion having substantially vertical side walls, means for reinforcing said plates, refractory material forming the bottom of said dog house, and means for cooling said jackets.

11. In a device of the class described, the combination of a furnace, a pair of S-shaped jackets providing a dog house for receiving raw materials added to said furnace, water-cooled means for moving raw materials into said furnace, and means for reciprocating said last means.

12. In a device of the class described, the combination of a furnace having an opening at one end thereof, a jacket forming a wall at said opening and extending outwardly from said furnace, a second jacket mounted above said outwardly extending portion to provide a cover therefor, a slidable jacket mounted on said cover jacket, means for directing raw materials on said cover jacket and into said furnace, and means for reciprocating said slidable jacket to push said raw materials from said cover jacket into said furnace.

13. In a device of the class described, the combination of a furnace having an opening at one end thereof, a jacket forming a wall at said opening and extending outwardly from said furnace, a second jacket mounted above said outwardly extending portion to provide a cover therefor, a slidable jacket mounted on said cover jacket, means for directing raw materials on said cover jacket and into said furnace, means for reciprocating said slidable jacket to push said raw materials from said cover jacket into said furnace, and means for scraping raw materials from said slidable jacket.

14. In a device of the class described, the combination in a glass furnace having an opening at one end, of a plurality of upright jackets having a portion fitting into the opening and adapted to be secured to the wall of the furnace and said jackets having a curved portion extending outwardly from the back wall to provide a chamber for charging the furnace, means substantially at one end of said jackets for securing said jackets to said furnace, and means at substantially the other end of said jackets for connecting said jackets together.

15. In a device of the class described, the combination of a glass furnace having an opening at one end, a plurality of jackets having portions forming a part of the back wall of the furnace at said opening, said jackets being secured to the wall of the furnace at the opening and having substantially S-shaped portions extending outwardly therefrom, the ends of said respective S-shaped portion being secured together to provide a chamber for feeding raw materials to the glass furnace, and means associated with each of said jackets for admitting a cooling medium to said jackets.

16. In a device of the class described, the combination of a furnace having an opening at one end and a pair of cooling jackets having portions fitting into said opening, and secured to the wall of the furnace, said jackets having curved portions extending outwardly from said furnace, means for connecting the outwardly extending portions of said jackets to provide a substantially U-shaped dog house for feeding raw materials to said furnace, and means for circulating a cooling medium within said jackets.

BANKS D. BROWN.